Sept. 10, 1929.    K. H. BOWEN    1,727,959
ELECTRICAL HEATING UNIT
Filed Jan. 2, 1929
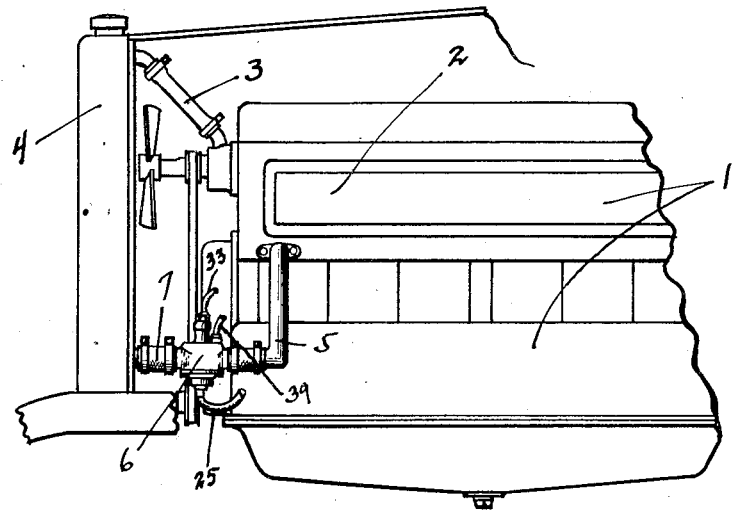
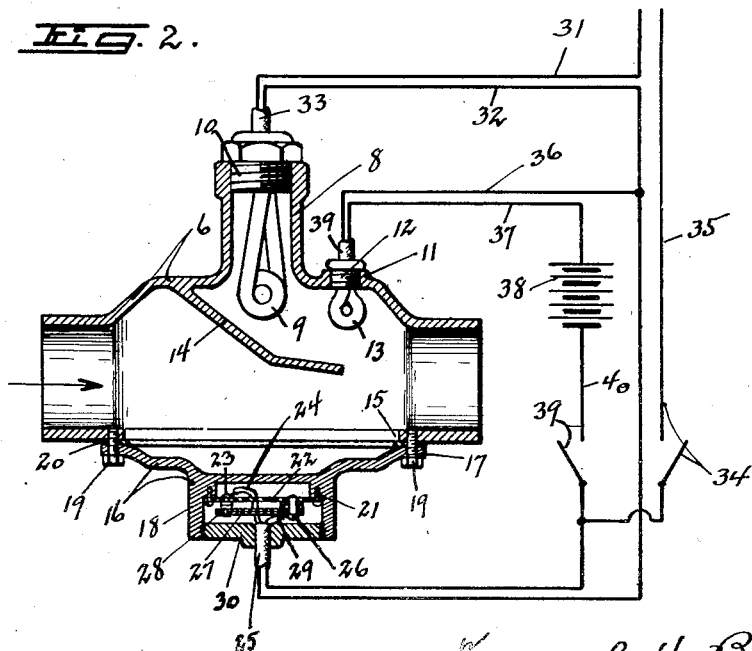

Patented Sept. 10, 1929.

1,727,959

UNITED STATES PATENT OFFICE.

KENNETH HERBERT BOWEN, OF AUBURN, NEW YORK.

ELECTRICAL HEATING UNIT.

Application filed January 2, 1929. Serial No. 329,762.

This invention relates to a new and improved electrical heating unit and is particularly designed for use in the water circulating system of a water cooled automotive engine.

When an automobile engine is inoperative and allowed to remain in an atmosphere of low temperature, there is the liability that the water in the cooling system may freeze and cause damage to the engine. Even if the temperature is not sufficiently low to cause the freezing of the water in the cooling system, it is frequently sufficiently low so that the temperature of the water and the engine cylinders which it surrounds will become low enough so that difficulty will be experienced in re-starting the engine.

To overcome this difficulty, various means have been employed to impart heat to the water in the cooling system of an automobile so that the temperature of the water may be maintained sufficiently high to keep the same from freezing and also sufficiently high to make easy the operation of re-starting the engine. When this is done, however, the desired result will be obtained if the water in the cooling system is held at a minimum pre-determined temperature. Such temperature having been determined as a proper minimum temperature, it is uneconomical and unnecessary to supply to the water heat units which will raise its temperature above such a pre-determined minimum.

The main object of my invention is to provide a means by which heat may be supplied to the water in the cooling system of an engine when the same is inoperative in order to maintain such water at a pre-determined minimum temperature.

Another object of my invention is to provide a means, controlled by that portion of the water which has the lowest temperature, which will automatically start and cut off the source of heat so that the coldest water in the system will be maintained at an approximately even minimum temperature.

Other objects and advantages relate to the size, shape and arrangement of parts all as will more fully appear from the following description taken in connection with the accompanying drawings, in which:

Figure 1 is a side elevation, partially broken away, of an automobile engine and radiator with my device in position on the same.

Figure 2 is longitudinal section through my device together with a diagrammatic illustration of the wiring system used therewith.

In the drawings, —1— is an automobile engine having the cylinders (not shown) inclosed in a water jacket —2—. The water jacket —2— has its upper forward end connected by means of a conduit —3— to a radiator —4—. A conduit —5— leads downwardly from the bottom forward end of water jacket —2— and is connected to one end of a heating unit case 6. The other end of the case 6 is connected by means of a conduit 7 to the lower end of radiator 4.

The heating unit casing —6— is provided with an upwardly extending tubular boss —8— in which is positioned an electrical heating unit 9 secured therein by a nut —10— in threaded connection with the upper end of boss 8. In the upper surface of casing 6 adjacent boss 8, I form a second boss 11 in which is threaded a nut 12. Nut 12 carries on its lower end an electrical heating unit 13. Heating units 9 and 13 both extend downwardly into the interior of casing 6 adjacent the top of such casing. An integral baffle 14 extends downwardly and rearwardly from the forward part of the top of casing 6 below and in spaced relation to the heating units 9 and 13. Baffle 14 is in spaced relation to the bottom portion of casing 6 to permit the passage thereby of the water in such casing.

The bottom of casing 6 is provided with a circular aperture indicated at 15. A thermostat casing 16 having a flanged annular rim 17 on its top and a depending tubular boss 18 is secured to the under surface of casing 6 by means of bolts 19, with flange 17 in registration with casing 6 adjacent the edge of aperture 15. An insulating gasket 20 is interposed between flange 17 and casing 6 for a purpose hereinafter to be described. In tubular boss 18 is secured, by screws 21 or other convenient means, a bar 22 having adjacent one end an electrical contact 23 from which is lead a wire 24 into conduit 25. On the other end of bar 22 is secured by a screw 26, a thermostatic switch member 27 preferably formed of two strips of metal having different co-efficients of expansion. On the end of member 27 beneath contact 23 is carried a second contact 28. The distortion of member 27 caused by the different temperatures to which it is subjected will in one position separate contacts 23 and 28 and in another position will bring contacts 23 and 28 into electrical contact.

The arrangement of parts is such that at a comparatively low temperature the contacts 23 and 28 will be in contact while at a comparatively high temperature they will be held out of contact, the temperatures at which such contact will be made and broken being predetermined and controlled by the construction of the member 27. A wire 29 is held in electrical contact with member 27 by screws 26 and extends outwardly through conduit 25. Conduit 25 has one end secured in a bottom plate 30 threaded into the lower end of tubular boss 18 to close the same.

Heating unit 9 has a wire 31 leading therefrom to a source of potential (not shown). A second wire 32 leads from heating unit 9 through wire 24 to contact 23. Wires 31 and 32 are encased in conduit 33. Wire 29 leads to one side of a switch 34, the other side of switch 34 leading through wire 35 to the source of potential. When the switch 34 is closed and contacts 23 and 28 are in electrical contact, a circuit will be completed from the source of potential through the heating unit 9.

The second heating unit 13 has a wire 36 leading therefrom which is connected to wire 24 and contact 23. Another wire 37 leads from heating unit 13 to the battery 38 of the automobile. The wires 36 and 37 are inclosed in a conduit 39. Wire 29 leads to one part of a switch 39, the other side of switch 39 having a wire 40 leading to battery 38. When switch 39 is closed and contacts 23 and 28 are in electrical contact a circuit will be completed from battery 38 through heating unit 13. The battery 38 is the battery of the automobile so that the heating unit 13 will receive its electrical energy from such battery. The source of potential heretofore referred to from which electrical energy is transmitted to heating unit 9 is a source extraneous to the automobile, and although I have not here shown a breakable connection between the heating unit 9 and the source of potential, it will be understood that a contact plug will be provided at some convenient place on the automobile whereby the circuit, in which heating unit 9 is positioned, may be connected to and disconnected from such extraneous source of potential.

*Operation.*

When the automobile is in a garage or other storage place, and the engine is not running, the circuit in which the heating unit 9 is connected will be joined to a source of potential. The switch 34 will then be closed. When the temperature of the water in casing 6, which temperature, of course, is transmitted through casing 16 to the movable thermostatic member 27, has dropped to a point where the member 27 will move upwardly to bring contacts 23 and 28 into electrical contact, the circuit from heating unit 9 to the source of potential will be complete, and heat units will be transferred to the water in casing 6. As the water in casing 6 which is above baffle 14 and in immediate contact with heating unit 9 becomes higher in temperature it will move upwardly into water jacket 2 and will be replaced by cooler water which will move downwardly from radiator 4 into casing 6 and past baffle 14 into immediate contact with heating unit 9. This operation will continue until the water in casing 16 has been raised to a sufficiently high temperature to cause the downward movement of thermostatic member 27 and the resulting breaking of the electrical contact of the contacts 23 and 28, which in turn will break the circuit from the source of potential to heating unit 9. When the temperature of the water in casing 6 has again dropped to a point where thermostatic member 27 is caused to move upwardly the operation just described will be repeated.

The baffle 14 is provided to insure the fact that the water coming from radiator 4 will be in immediate contact with casing 16, while the water above baffle 14 which has been in immediate contact with heating unit 9 will move upwardly into water jacket 2 without coming into contact with casing 16, with the result that the action of the thermostatic switch heretofore described will be controlled by the temperature of the water coming from the radiator 4, that is to say, will be controlled by that part of the water in the system which is at the lowest temperature.

The insulating gasket 20 is provided so that the heating units, which are transferred directly to the casing 6 from the heating unit 9 will not be conducted through the shell of casing 6 to casing 16 and thence to the thermostatic switch.

When the automobile is in a place where the circuit containing heating unit 9 cannot be connected to a source of potential, and it is desired to heat the water in the circulating system, the switch 39 is closed. When the water in the system is lowered in temperature sufficient to cause thermostatic member 27 to move upwardly and bring contacts 23 and 28 into electrical contact, the circuit between battery 38 and heating unit 13 will be completed so that heat units will pass from the heating unit to the water in casing 6.

The operation of the thermostatic switch for making and breaking the circuit between heating unit 13 and battery 38 is exactly the same as its operation in making and breaking the circuit between heating unit 9 and the source of potential just described.

It will be understood that the size, type and particular location of the heating units herein described may be varied to a considerable extent. It will also be understood that the particular type of thermostat may be varied provided only that it be of a type which may be made operative within the range of temperatures at which it is desired to maintain the water in the water circulating system.

It will also be understood that the particular place in the water circulating system in which the various parts of my device are positioned may also be varied, for although I have shown and described a specific structure and form of part as an exemplification of an embodiment of my invention, I do not desire to restrict myself to the exact size, shape or arrangement of parts, as various changes may be made within the scope of the appended claims.

I claim:

1. In a device of the class described, an engine, a water circulating system for the cylinders thereof, an electrical heating unit in the water circulating system, a source of potential, a circuit connecting the heating unit to the source of potential including a thermostatic switch adjacent to the water circulating system and arranged in spaced relation below the heating unit, and a baffle in the water circulating system interposed between the heating unit and the thermostatic switch to guide water directly after it has been heated, away from the thermostatic switch.

2. In a device of the class described, an engine, a water circulating system for the cylinders thereof, an electrical heating unit in the water circulating system, a source of potential, a circuit connecting the heating unit to the source of potential including a thermostatic switch adjacent the water circulating system and in spaced relation to the heating unit, and a baffle in the water circulating system interposed between the heating unit and the thermostatic switch to guide water directly after it has been heated, away from the thermostatic switch.

3. In a device of the class described, an engine, a water circulating system for the engine, including a heating chamber, a heating unit in the chamber, a casing containing a thermostatic switch attached to the chamber and having one of its walls forming a wall of the heating chamber, a source of potential, and a circuit connecting the heating unit to the source of potential, and including the thermostatic switch.

4. In a device of the class described, an engine, a water circulating system for cooling the engine, including a heating chamber, a heating unit in the chamber, a casing containing a thermostatic switch attached to the chamber with a heat insulating gasket therebetween and having one of its walls forming a wall of the heating chamber, a source of potential, and a circuit connecting the heating unit to the source of potential and including the thermostatic switch.

5. In a device of the class described, an automobile having an engine, a water circulating system for the engine, a heating unit in the water circulating system, an extraneous source of potential, a circuit connecting the heating unit and the source of potential, a second smaller heating unit in the water circulating system, a battery on the automobile, a circuit connecting the second named heating unit to the battery and a thermostatic switch actuated by the temperature of the water in the circulating system connected to both of the circuits.

6. In a device of the class described, an automobile having an engine and a radiator, upper and lower conduits connecting the radiator to the engine, a tubular casing interposed in one of said conduits and provided at one side thereof with a projecting hollow boss and at its opposite side with a port, a baffle in the casing extending lengthwise thereof for directing water flowing through the casing toward the port and away from the boss, an electric heating unit extending through the boss into the casing and segregated from the port by said baffle, a second casing closing said port and provided with a chamber that is segregated from the interior of the casing, a thermostatic switch arranged in said chamber, a source of potential, and an electrical circuit in which the source of potential, heating unit and thermostatic switch are interposed.

In witness whereof I have hereunto set my hand this 24 day of December, 1928.

KENNETH H. BOWEN.